United States Patent [19]
Kikuchi et al.

[11] Patent Number: 5,059,006
[45] Date of Patent: Oct. 22, 1991

[54] COMPACT ZOOM LENS

[75] Inventors: Shuichi Kikuchi, Yokohama; Masami Itoh, Tokyo, both of Japan

[73] Assignee: Ricoh Company Ltd., Tokyo, Japan

[21] Appl. No.: 630,286

[22] Filed: Dec. 19, 1990

[30] Foreign Application Priority Data

Dec. 22, 1989 [JP] Japan .................................. 1-333653
Dec. 25, 1989 [JP] Japan .................................. 1-336029
Oct. 11, 1990 [JP] Japan .................................. 2-272937

[51] Int. Cl.$^5$ .......................................... G02B 15/177
[52] U.S. Cl. ..................................... 350/426; 350/427
[58] Field of Search ...................... 350/423, 426, 427

[56] References Cited

U.S. PATENT DOCUMENTS 4,168,110 9/1979 Itoh ..................................... 350/426
4,299,453 11/1981 Momiyama et al. ................ 350/426
4,909,613 3/1990 Kikuchi ........................... 350/426 X

*Primary Examiner*—Scott J. Sugarman
*Attorney, Agent, or Firm*—Fish & Richardson

[57] ABSTRACT

A compact zoom lens has a first lens group having a negative focal length $f_1$; a second lens group having a positive focal length $f_2$; and a third lens gorup having a negative focal length $f_3$. The first, second and third lens groups are sequentially arranged from an object side of the zoom lens to an image side thereof. The first to third lens groups are moved on the object side while the mutual distances between the first, second and third lens groups are changed to perform a zooming operation from a wide angle side to a telescopic side. The third lens group is constructed by positive, negative and positive lenses sequentially arranged from the object side to the image side such that the negative and positive lenses respectively constituting the second and third lenses are joined to each other. The focal lengths $f_1$, $f_2$, $f_3$ and a focal length $f_w$ of an entire lens system at a wide angle end of the zoom lens satisfy the following conditions.

$$0.3 < |f_3|/|f_1| < 1.0 \quad \text{(i)}$$

$$1.2 < |f_1|/f_w < 2.3 \quad \text{(ii)}$$

$$0.9 < |f_3|/f_w < 1.4 \quad \text{(iii)}$$

An Abbe number $\nu_{3N}$ of the second negative lens and an Abbe number $\nu_{3P}$ of the third positive lens in the third lens group may satisfy the following condition. (iv) $\nu_{3N} > \nu_{3P}$ The third lens group may be constructed by positive, negative, positive and negative lenses sequentially arranged from the object side to the image side.

10 Claims, 15 Drawing Sheets

SPHERICAL ABERRATION (SA)
SINE CONDITION (SC)

ASTIGMATISM

DISTORTION ABERRATION (%)

MERIDIONAL COMATIC ABERRATION

SPHERICAL ABERRATION (SA)
SINE CONDITION (SC)

ASTIGMATISM

DISTORTION ABERRATION (%)

MERIDIONAL COMATIC ABERRATION

SPHERICAL ABERRATION (SA)
SINE CONDITION (SC)

ASTIGMATISM

DISTORTION ABERRATION (%)

MERIDIONAL COMATIC ABERRATION

F3.23

-0.50 0 0.50
SPHERICAL
ABERRATION (SA)
SINE
CONDITION (SC)

31.8°

-0.50 0 0.50
ASTIGMATISM 31.8°

-5.00 0 5.00
DISTORTION
ABERRATION (%)

$\omega/2 = 23.1°$

MERIDIONAL COMATIC
ABERRATION

F 5.1

SPHERICAL ABERRATION (SA)
SINE CONDITION (SC)

19.8°

ASTIGMATISM 19.8°

DISTORTION ABERRATION (%)

$\omega/2 = 14.1°$

MERIDIONAL COMATIC ABERRATION

F7.7

-0.50 0 0.50
SPHERICAL
ABERRATION (SA)
SINE
CONDITION (SC)

11.9°

-0.50 0 0.50
ASTIGMATISM 11.9°

-5.00 0 5.00
DISTORTION
ABERRATION (%)

ω/2 = 8.4°

MERIDIONAL COMATIC
ABERRATION

F3.23

-0.50 0 0.50
SPHERICAL ABERRATION (SA)
SINE CONDITION (SC)

30.8°

-0.50 0 0.50
ASTIGMATISM 30.8°

-5.00 0 5.00
DISTORTION ABERRATION (%)

$\omega/2 = 22.7°$

MERIDIONAL COMATIC ABERRATION

F 5.16

SPHERICAL ABERRATION (SA)
SINE CONDITION (SC)

19.4°

ASTIGMATISM 19.4°

DISTORTION ABERRATION (%)

ω/2 = 13.9°

MERIDIONAL COMATIC ABERRATION

F3.23 gSA, dSA, SC

−0.50 0 0.50

SPHERICAL ABERRATION (SA)

SINE CONDITION (SC)

30.9°

S, M

−0.50 0 0.50

ASTIGMATISM 30.9°

−5.00 0 5.00

DISTORTION ABERRATION (%)

ω/2 = 22.7° d, g

+0.1 / −0.1

MERIDIONAL COMATIC ABERRATION

F 7.91

-0.50 0 0.50
SPHERICAL
ABERRATION (SA)
SINE
CONDITION (SC)

11.8°

-0.50 0 0.50
ASTIGMATISM 11.8°

-5.00 0 5.00
DISTORTION
ABERRATION (%)

ω/2 = 8.4°

MERIDIONAL COMATIC
ABERRATION

COMPACT ZOOM LENS

BACKGROUND OF THE INVENTION

1. Field of the Invention

The present invention relates to a compact zoom lens composed of a plurality of lenses.

2. Description of the Related Art

A known zoom lens having a high zoom ratio about three is constructed by negative, positive and negative lens groups as shown in Japanese Patent Application Laying Open (KOKAI) Nos. 64-72114 and 2-63007.

However, the zoom lens disclosed in Japanese Patent Application Laying Open No. 64-72114 has a problem that chromatic aberration with respect to magnification is large.

In the zoom lens disclosed in Japanese Patent Application Laying Open No. 2-63007, a third lens group is constructed by four lenses arranged respectively in the order of a convex lens, a concave lens, a concave lens and a convex lens, and accordingly the zoom lens makes it possible to correct chromatic aberration with respect to magnification, but requires as many as four pieces of lenses. Furthermore, the zoom lens includes a fourth lens group in which a convex lens is arranged as the last lens of the fourth lens group, and consequently the fourth lens group becomes large in its size.

SUMMARY OF THE INVENTION

It is therefore an object of the present invention to provide a compact zoom lens constructed by negative, positive and negative lens groups and having a small change in chromatic aberration with respect to magnification caused in a zooming operation.

The above object of the present invention can be achieved by a compact zoom lens comprising a first lens group having a negative focal length $f_1$; a second lens group having a positive focal length $f_2$; and a third lens group having a negative focal length $f_3$; the first, second and third lens groups being sequentially arranged from an object side of the zoom lens to an image side thereof; the first to third lens groups being moved on the object side while the mutual distances between the first, second and third lens groups are changed to perform a zooming operation from a wide angle side to a telescopic side; said third lens group being constructed by positive, negative and positive lenses sequentially arranged from the object side to the image side such that the negative and positive lenses respectively constituting the second and third lenses are joined to each other; and said focal lengths $f_1$, $f_2$, $f_3$ and a focal length $f_w$ of an entire lens system at a wide angle end of the zoom lens satisfying the following conditions.

$$0.3 < |f_3|/|f_1| < 1.0 \quad \text{(i)}$$

$$1.2 < |f_1|/f_w < 2.3 \quad \text{(ii)}$$

$$0.9 < |f_3|/f_w < 1.4 \quad \text{(iii)}$$

The above object of the present invention can be also achieved by a compact zoom lens comprising a first lens group having a negative focal length $f_1$; a second lens group having a positive focal length $f_2$; and a third lens group having a negative focal length $f_3$; the first, second and third lens groups being sequentially arranged from an object side of the zoom lens to an image side thereof; the first to third lens groups being moved on the object side while the mutual distances between the first, second and third lens groups are changed to perform a zooming operation from a wide angle side to a telescopic side; said third lens group being constructed by positive, negative, positive and negative lenses sequentially arranged from the object side to the image side such that the negative and positive lenses respectively constituting the second and third lenses are joined to each other; and said focal lengths $f_1$, $f_2$, $f_3$ and a focal length $f_w$ of an entire lens system at a wide angle end of the zoom lens satisfying the following conditions, $$0.3 < |f_3|/|f_1| < 1.0 \quad \text{(i)}$$

$$1.2 < |f_1|/f_w < 2.3 \quad \text{(ii)}$$

$$0.9 < |f_3|/f_w < 1.4 \quad \text{(iii)}$$

In accordance with the above structures, it is possible to provide a compact zoom lens constructed by negative, positive and negative lens groups and having a small change in chromatic aberration with respect to magnification caused in the zooming operation.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a compact zoom lens in the present invention will next be described in detail with reference to the accompanying drawings.

Figure 1:
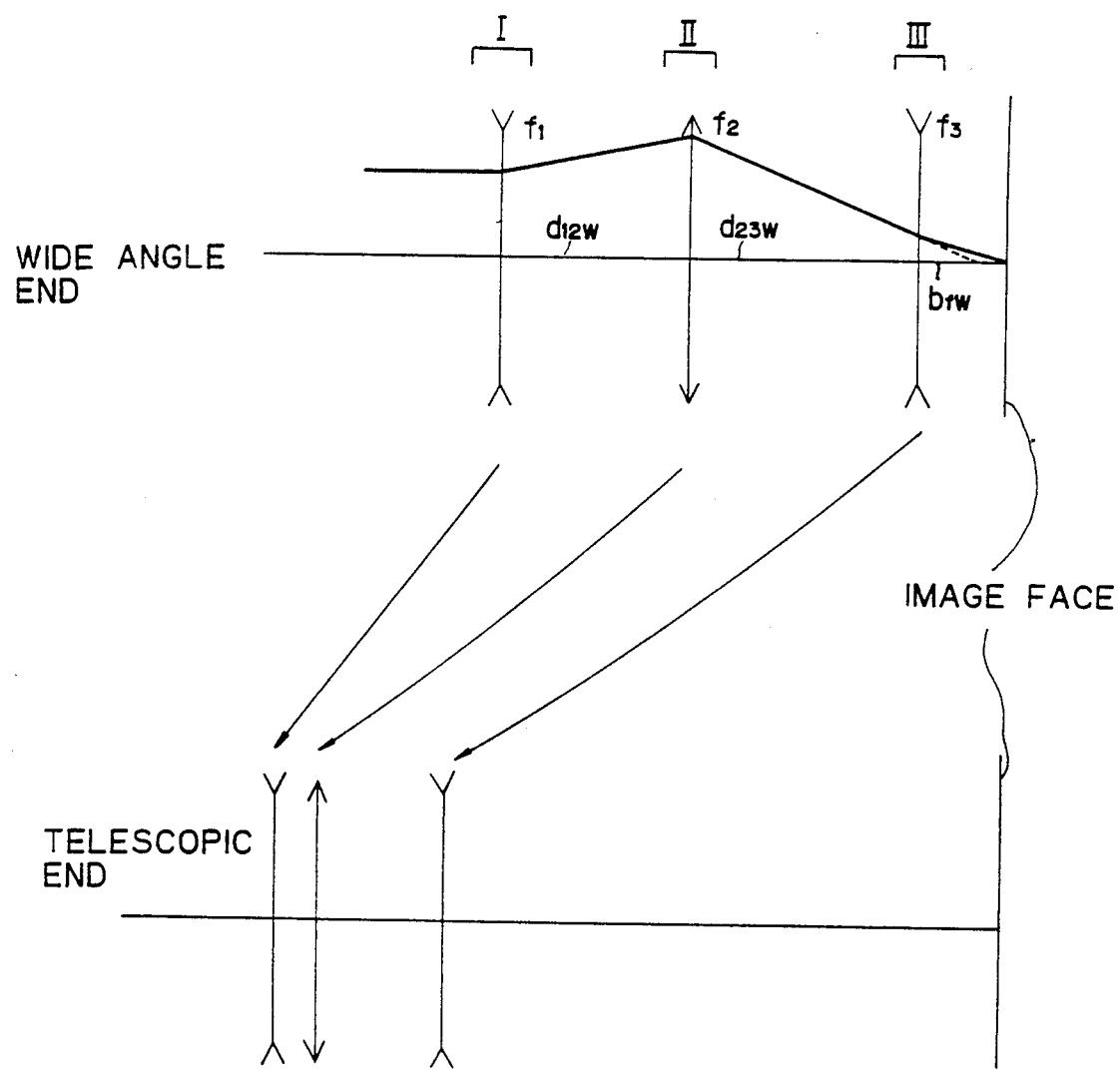
FIG. 1 is a view for explaining the arrangement of lens groups and movements thereof at a zooming time in a compact zoom lens in the present invention.

As shown in FIG. 1, in a compact zoom lens in the present invention, first, second and third lens groups I, II, III are sequentially arranged from an object side of the zoom lens (on the left-hand side in FIG. 1) to an image side thereof (on the right-hand side in FIG. 1).

The first lens group I has a negative focal length $f_1$. The second lens group II has a positive focal length $f_2$. The third lens group III has a negative focal length $f_3$. The first to third lens groups I, II, III are moved on the object side while the mutual distances between the first, second and third lens groups are changed to perform a zooming operation from a wide angle side of the zoom lens to a telescopic side thereof.

The above focal lengths $f_1$, $f_2$, $f_3$ and the focal length $f_w$ of an entire lens system at a wide angle end of the zoom lens satisfy the following conditions.

$$0.3 < |f_3|/|f_1| < 1.0 \qquad \text{(i)}$$

$$1.2 < |f_1|/f_w < 2.3 \qquad \text{(ii)}$$

$$0.9 < |f_3|/f_w < 1.4 \qquad \text{(iii)}$$

The zoom lenses in first and second embodiments in the present invention concretely have different lens structures with respect to the third lens group.

In the first embodiment of the present invention, the third lens group III is constructed by positive, negative and positive lenses sequentially arranged from the object side to the image side such that the negative and positive lenses respectively constituting the second and third lenses are joined to each other. An Abbe number $\nu_{3N}$ of the second negative lens and an Abbe number $\nu_{3P}$ of the third positive lens in the third lens group satisfy the following condition.

$$\nu_{3N} > \nu_{3P} \qquad \text{(iv)}$$

In the second embodiment of the present invention, the third lens group III is constructed by positive, negative, positive and negative lenses sequentially arranged from the object side to the image side such that the negative and positive lenses respectively constituting the second and third lenses are joined to each other. Similar to the zoom lens in the first embodiment, an Abbe number $\nu_{3N}$ of the second negative lens and an Abbe number $\nu_{3P}$ of the third positive lens in the third lens group III satisfy the above condition (iv).

The first lens group having a negative focal length is arranged before the second lens group as a master lens group having a positive focal length. The distance between the first and second lens groups is changed in a zooming operation. Thus, an apparent diameter of a diaphragm, i.e., a diameter of entrance pupil with respect to the master lens group is changed in accordance with the zooming operation so that an F-number of the zoom lens can be reduced at a telescopic time. The first and second lens groups are separated from each other at a wide angle end of the zoom lens. However, the increase in lens diameter can be restrained since the first lens group constitutes a lens system having a negative focal length.

The first and second lens groups respectively having negative and positive focal lengths constitute a two-group zoom system of a retro-focus type suitable for a wide angle. The zooming operation is partially performed by the first and second lens groups.

A combination lens system of the first lens group having a negative focal length and the second lens group having negative lateral magnification has a positive focal length. A third lens group having a negative focal length is arranged after this combination lens system so that the entire lens system is of a telephoto type. Thus, it is possible to make the entire zoom lens compact by such a structure.

The lateral magnification of the zoom lens is greatly changed by rapidly moving the third lens group toward the combination lens system of the first and second lens groups when the zooming operation is performed from a wide angle side of the zoom lens onto a telescopic side thereof, thereby increasing a zoom ratio.

The distance between principal points of the first and second lens groups is set to $d_{12}$. The distance between a principal point of the third lens group on a rear side thereof and an image face of the entire lens system, i.e., a back focus is set to bf. The focal length of the entire lens system is set to f. Refracting powers of the first to third lens groups are respectively set to $\phi_1(\equiv 1/f_1)$, $\phi_2(\equiv 1/f_2)$ and $\phi_3(\equiv 1/f_3)$. Refracting power of the entire lens system is set to $\phi(\equiv 1/f)$. In this case, the following relation is formed.

$$\phi_3 = (1/bf)[1 - (1/\phi)\{\phi_1(1 - d_{12}\phi_2) + \phi_2\}]$$

The refracting powers $\phi_1$ and $\phi_3$ are inversely proportional to each other under a condition $d_{12} < 1/\phi_2$.

The above condition (i) prescribes a relation between the first and third lens groups based on this relation with respect to the refracting powers. When the ratio in the condition (i) exceeds an upper limit thereof, the zoom lens is not compact at the telescopic time. In contrast to this, when the ratio in the condition (i) exceeds a lower limit thereof, the F-number is increased at the telescopic time.

The conditions (ii) and (iii) provide limits for the focal lengths $f_1$ and $f_3$ under the condition (i). When the ratio in the condition (ii) exceeds an upper limit thereof, the effects provided by the negative focal length of the first lens group are reduced and the F-number at the telescopic time is increased. Further, combined refracting power of the first and second lens groups is increased so that the lateral magnification of the third lens group is increased. Therefore, a moving amount of the third lens group caused by the zooming operation is increased so that the distances between the lens groups cannot be sufficiently secured at the telescopic time. In contrast to this, when the ratio in the condition (ii) exceeds a lower limit thereof, the distance between the second and third lens groups is increased at the wide angle time. Therefore, the diameter of the third lens group is increased or the amount of a marginal ray is reduced.

When the ratio in the condition (iii) exceeds an upper limit thereof, it is impossible to sufficiently provide a telephoto lens and the entire lens system is not compact. In contrast to this, when the ratio in the condition (iii) exceeds a lower limit thereof, a Petzval's sum of the entire lens system is reduced so that it is difficult to provide an image face suitably balanced with respect to central and peripheral portions thereof.

In the zoom lens of the present invention, it is desirable to further satisfy the following conditions (v) and (vi) so as to efficiently perform the zooming operation. Namely, the distance $d_{12w}$ between principal points of the first and second lens groups and the distance $d_{23w}$ between principal points of the second and third lens groups at the wide angle time satisfy the following conditions.

$$d_{12w}/f_2 < 1 \qquad \text{(v)}$$

$$d_{23w}/f_w < 0.85 \qquad (vi)$$

The condition (v) means that the distance between the first and second lens groups at the wide angle time is set to a value greater than a constant value. This condition relates to the refracting power of the third lens group.

The refracting power $\phi_{12w}$ of the combination lens system of the first and second lens groups at the wide angle time, the back focus $bf_w$, and the refracting power $\phi_w$ of the entire lens system at the wide angle time satisfy the following relation.

$$|f_3| = |bf_w/[1-\{(\phi_1+\phi_2-d_{12w}\phi_1\phi_2)/\phi_w\}]$$

In a lens system in which the back focus is reduced to effectively reduce the size of the entire lens system, $|f_3|$ is reduced when the back focus $bf_w$ is reduced. However, when the distance $d_{12w}$ is increased so that the ratio in the condition (v) exceeds a range set in the condition (v), $|f_3|$ is further reduced so that it is difficult to suitably hold the Petzval's sum of the entire lens system. Further, the diameter of the first lens group is increased at the wide angle time.

The condition (vi) is a condition for prescribing the distance between the second and third lens groups at the wide angle time. When the ratio in the condition (vi) exceeds a range set in this condition (vi), a ray height of the third lens group is increased so that the diameter of the third lens group is increased or the amount of a marginal ray is insufficient.

In the present invention, to cover a zooming region from a wide angle set by half angle of view about 31 degrees to a zoom ratio about three, the third lens group is greatly moved on the object side of the zoom lens when the zooming operation is performed from the wide angle side to the telescopic side. Accordingly, when chromatic aberration of the third lens group with respect to magnification is insufficiently corrected, the chromatic aberration with respect to magnification is greatly changed by the zooming operation, thereby deteriorating the performance of the zoom lens.

Therefore, in the zoom lens in the first embodiment of the present invention, the third lens group is constructed by positive, negative and positive lenses sequentially arranged from the object side. The negative and positive lenses respectively constituting the second and third lenses are joined to each other to provide a joining lens. The condition (iv) prescribes the relation between Abbe numbers $\nu_{3N}$ and $\nu_{3P}$ of the negative and positive lenses in this joining lens.

In the zoom lens in the second embodiment of the present invention, the third lens group is constructed by positive, negative, positive and negative lenses sequentially arranged from the object side. The negative and positive lenses respectively constituting the second and third lenses are joined to each other to provide a joining lens. The condition (iv) prescribes the relation between Abbe numbers $\nu_{3N}$ and $\nu_{3P}$ of the negative and positive lenses in this joining lens.

When the condition (iv) is satisfied, it is possible to correct the chromatic aberration with respect to positive magnification easily caused in the third lens group having negative refracting power. Therefore, it is possible to reduce the change in chromatic aberration with respect to the magnification of the entire lens system caused by the zooming operation.

In the zoom lens in the first embodiment of the present invention, only the second lens of the three lenses constituting the third lens group is constructed by a negative lens. Therefore, an object side surface of this negative lens has a small radius of curvature so that aberrations of higher orders are greatly caused. Accordingly, it is desirable to form an aspherical surface on the object side of the negative lens in the third lens group such that curvature is reduced as the object side of the negative lens is separated from an optical axis of the lens system.

Further, in the zoom lenses of the first and second embodiments of the present invention, it is desirable to construct the first lens group by negative and positive lenses arranged from the object side, and satisfy the following condition with respect to Abbe numbers $\nu_{1N}$ and $\nu_{1P}$ of these negative and positive lenses.

$$\nu_{1N}-\nu_{1P} > 17 \qquad (vii)$$

When this condition is satisfied, it is possible to correct the chromatic aberration of the first lens group with respect to magnification on the optical axis of the lens system, thereby correcting various kinds of aberrations.

The concrete Embodiments 1 to 4 will next be described in detail.

In the respective Embodiments, reference numeral $r_i$ designates a radius of curvature of an i-th face (including a diaphragm face) counted from the object side. Reference numeral $d_i$ designates a distance between the i-th face and an (i+1)-th face on the optical axis of the lens system. Reference numerals $n_j$ and $\nu_j$ respectively designate a refractive index and an Abbe number of a j-th lens counted from the object side on line d. A combined focal length of the entire lens system is designated by reference numeral f and an angle of view is designated by reference numeral $\omega$ (degree).

Figure 2:
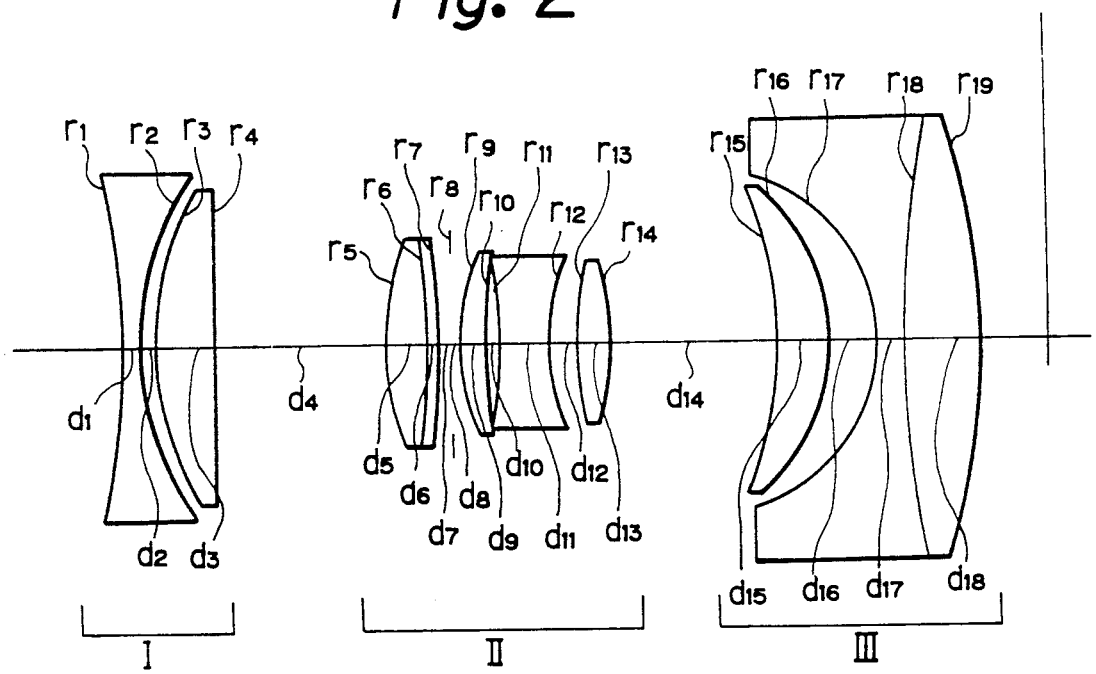
FIG. 2 is a view showing the construction of a zoom lens in accordance with a concrete Embodiment 1 of the present invention.
Figure 3:
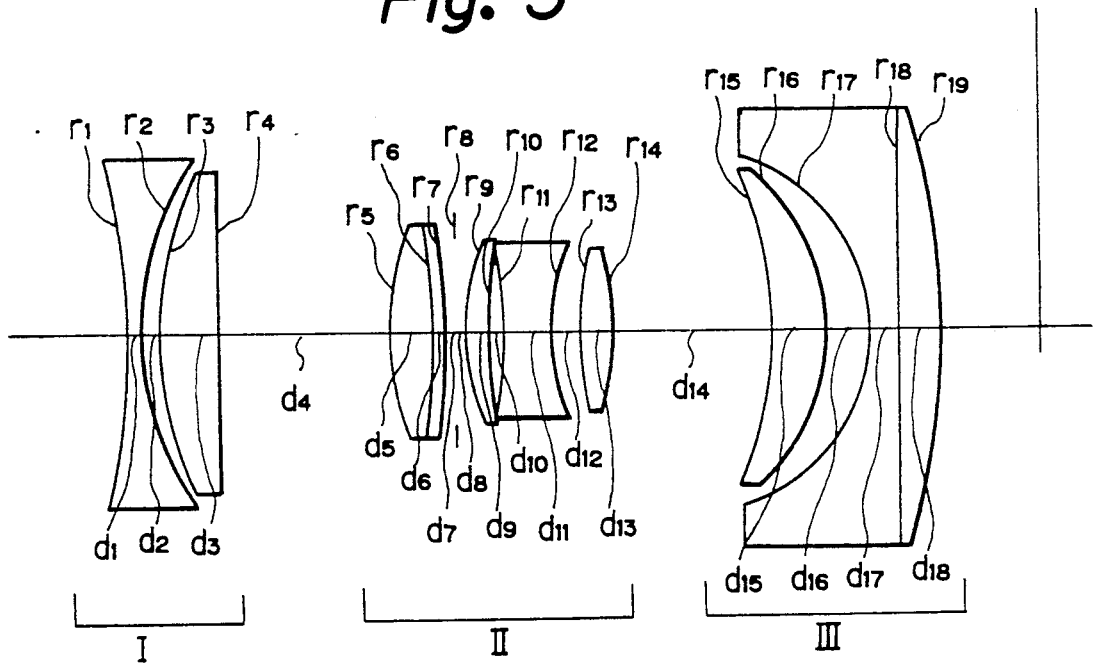
FIG. 3 is a view showing the construction of a zoom lens in accordance with a concrete Embodiment 2 of the present invention.
Figure 4A:
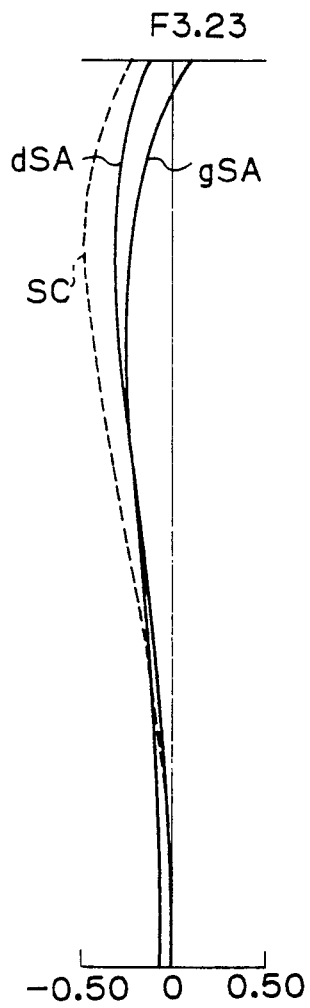
FIGS. 4(a), 4(b), 4(c), 4(d), 5(a), 5(b), 5(c), 5(d), 6(a), 6(b), 6(c) and 6(d) are aberration diagrams of the zoom lens in the concrete Embodiment 1 of the present invention.
Figure 4B:
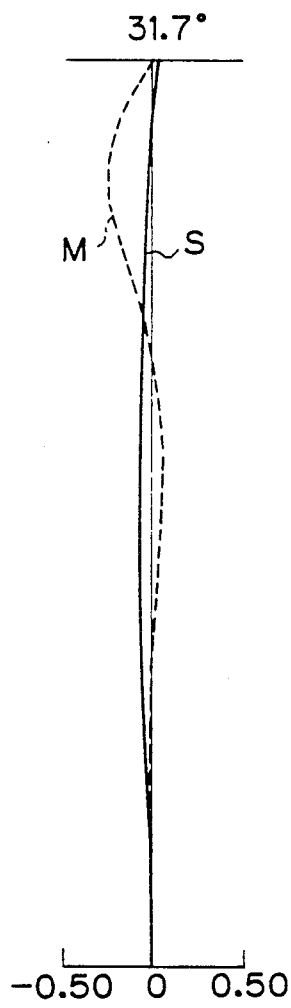
Figure 4C:
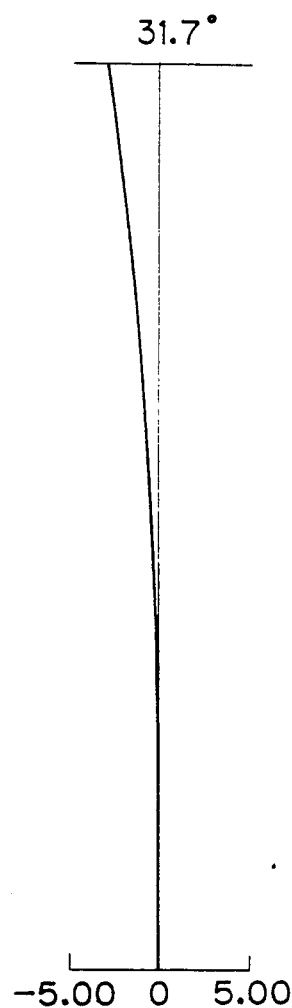
Figure 4D:
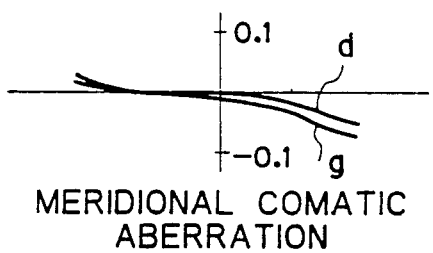
Figure 5A:
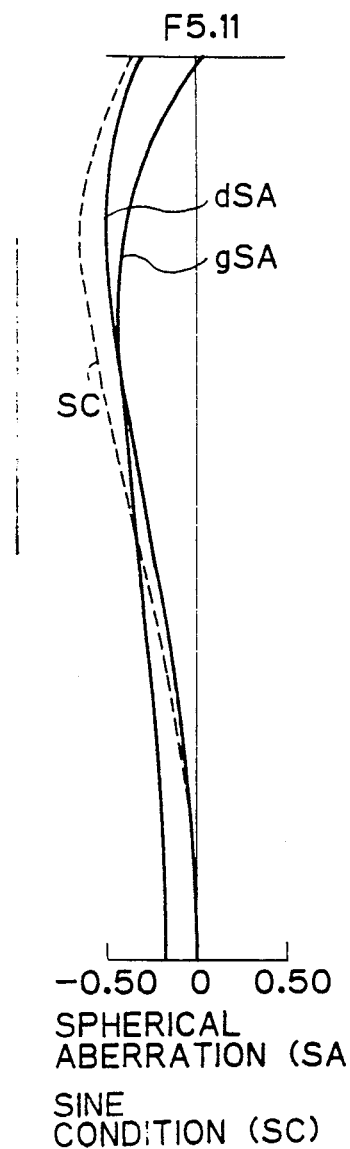
Figure 5B:
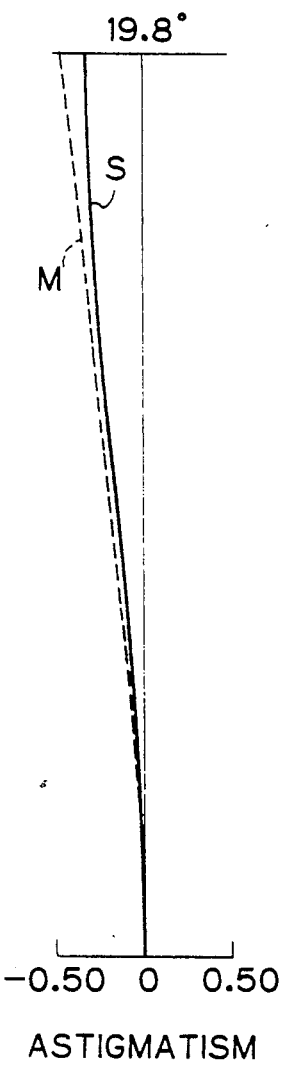
Figure 5C:
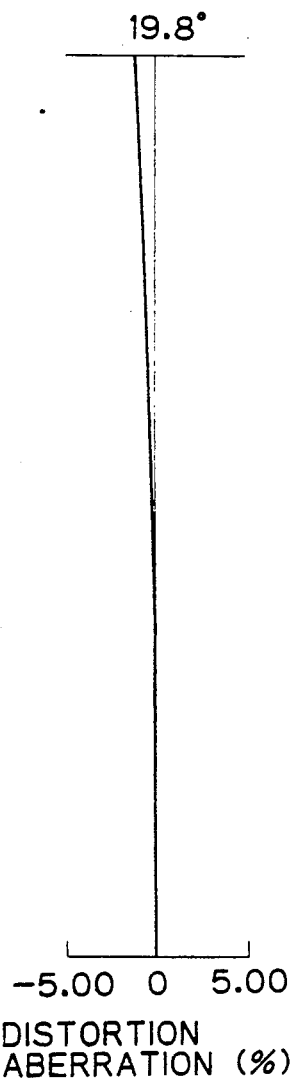
Figure 5D:
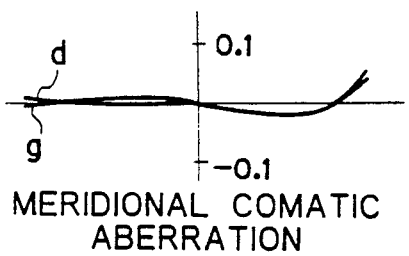
Figure 6A:
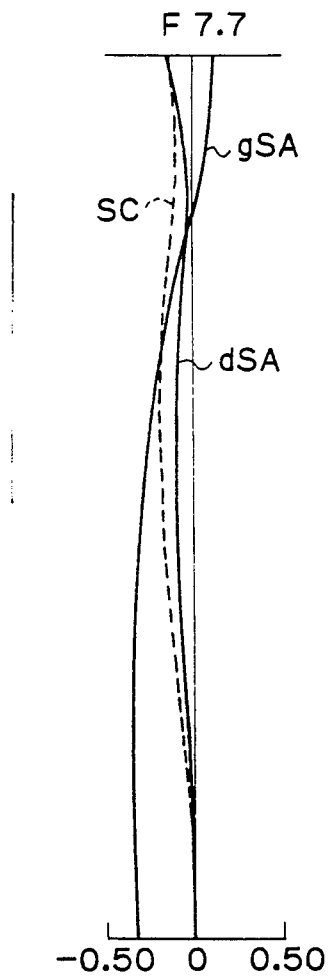
Figure 6B:
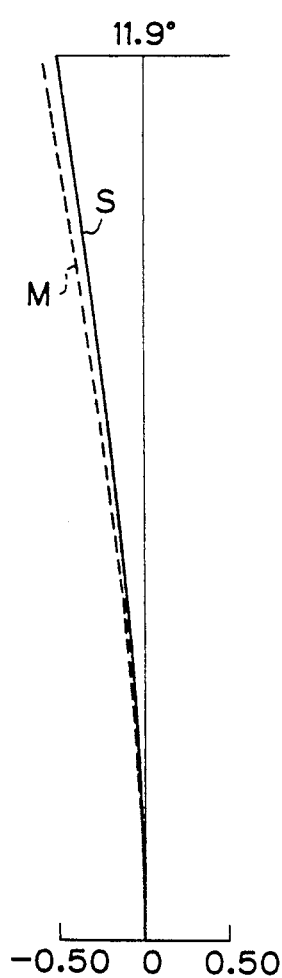
Figure 6C:
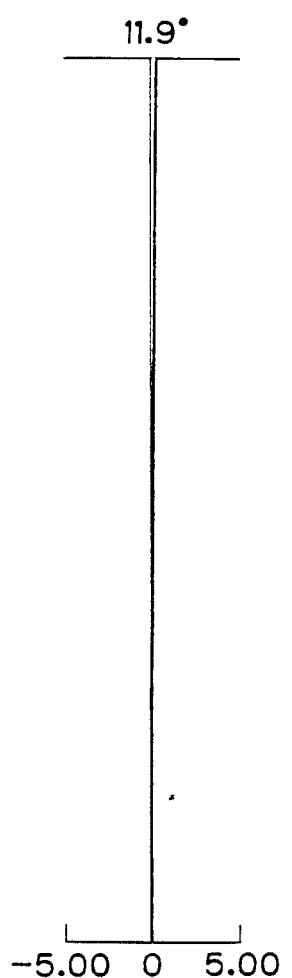
Figure 6D:
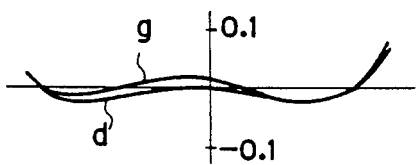
Figure 7A:
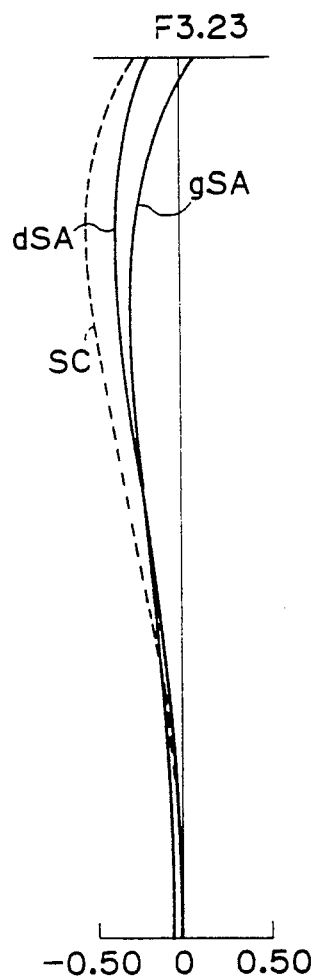
FIGS. 7(a), 7(b), 7(c), 7(d), 8(a), 8(b), 8(c), 8(d), 9(a), 9(b), 9(c), and 9(d) are aberration diagrams of the zoom lens in the concrete Embodiment 2 of the present invention.
Figure 7B:
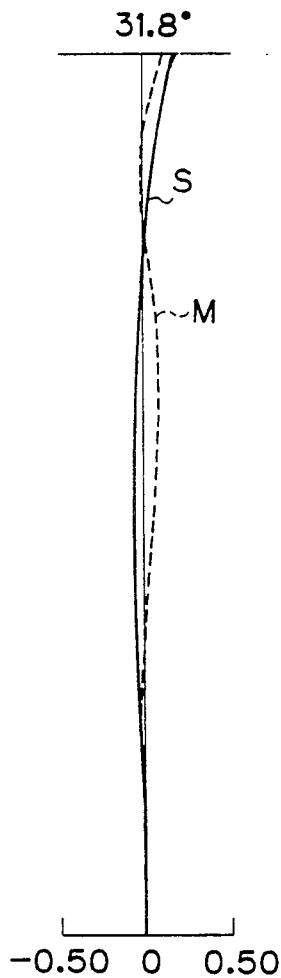
Figure 7C:
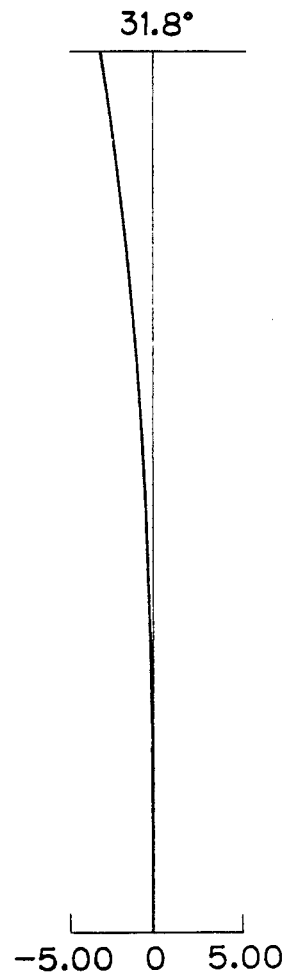
Figure 7D:
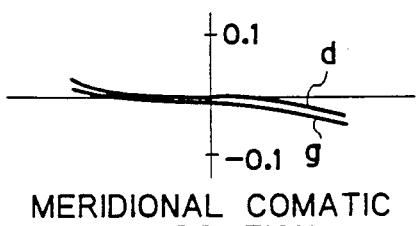
Figure 8A:
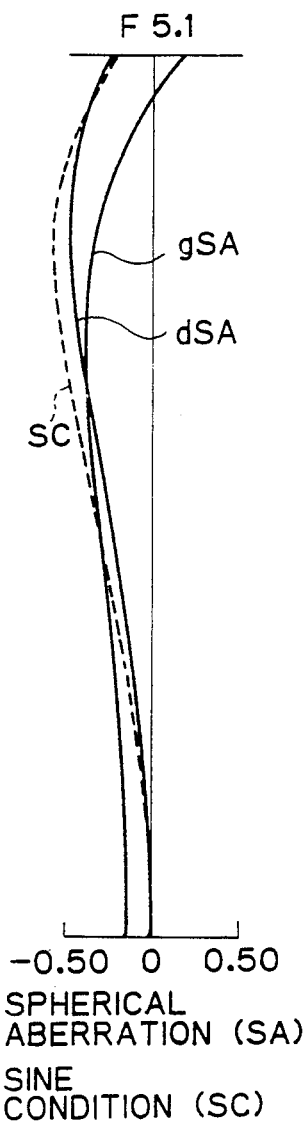
Figure 8B:
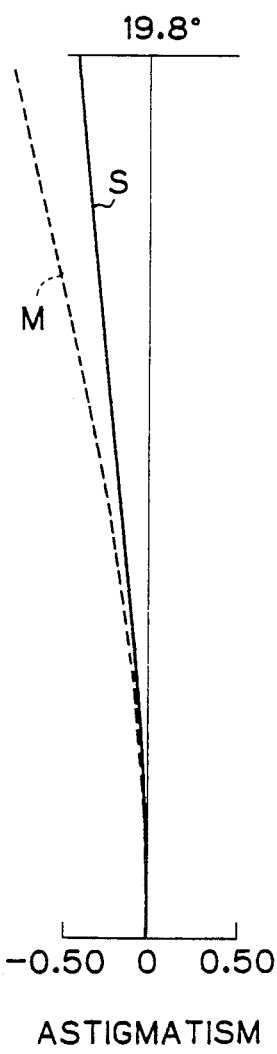
Figure 8C:
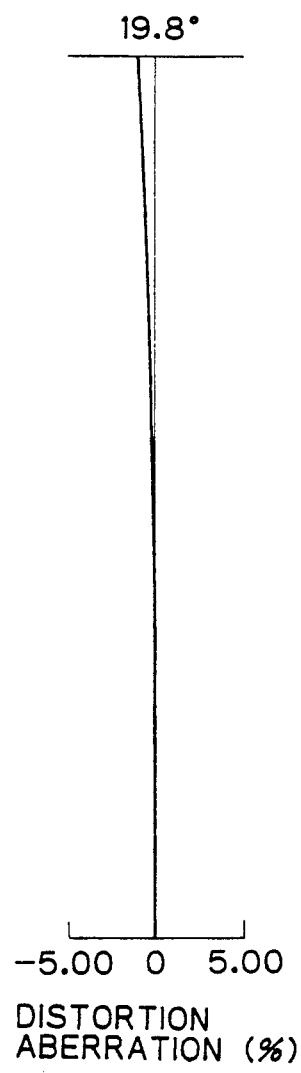
Figure 8D:
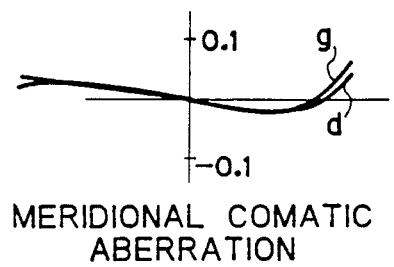
Figure 9A:
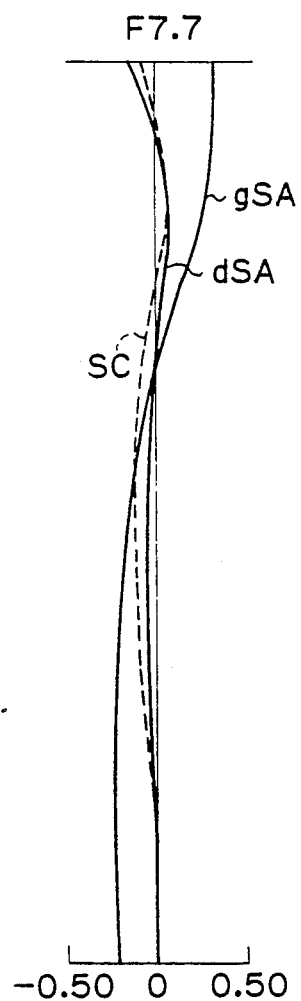
Figure 9B:
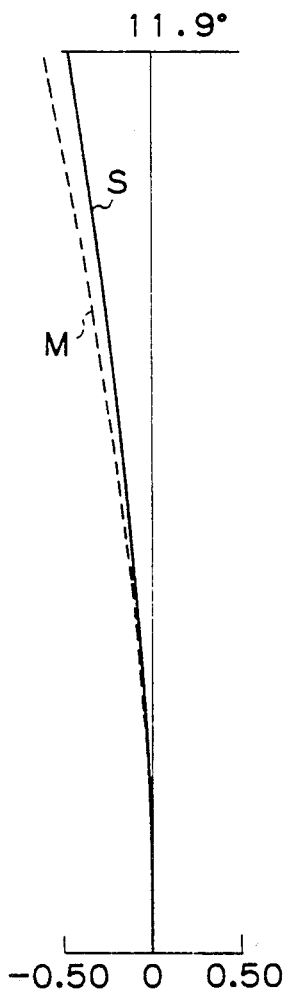
Figure 9C:
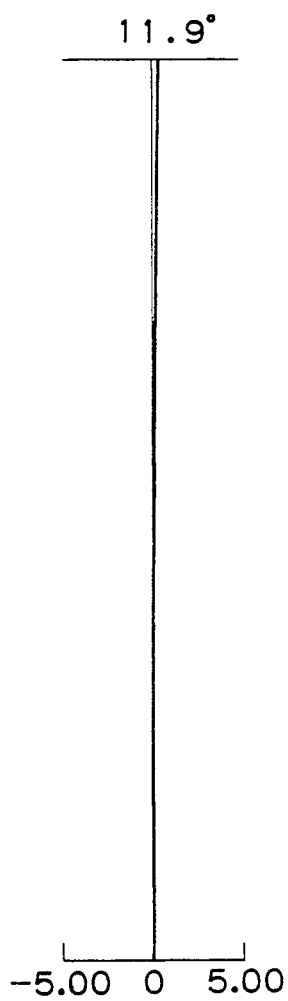
Figure 9D:
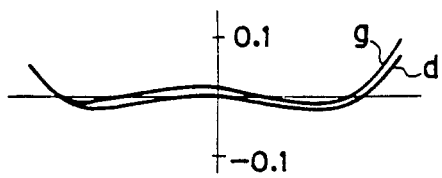

The constructions of compact zoom lenses in concrete Embodiments 1 and 2 in accordance with the first embodiment of the present invention are respectively shown in FIGS. 2 and 3. Reference numeral Y designates an axis of coordinate perpendicular to the optical axis of the lens system. Reference numeral Z designates an axis of coordinate in the direction of the optical axis of the lens system. Reference numeral r designates a radius of curvature on the optical axis of the lens system. Reference numerals A, B and C respectively designate aspherical coefficients of higher orders. In this case, "aspherical surface" in the Embodiments 1 and 2 is a curved surface obtained by rotating a curve represented by the following formula, $$Z = (1/r)/[1+\{1-(1/\gamma^2)Y^2\}^{\frac{1}{2}}]+AY^4+BY^6+CY^8$$

around the optical axis of the lens system. In the Embodiments 1 and 2, the aspherical surface is designated by mark *. The shape of the aspherical surface is specified by providing the aspherical coefficients A, B and C in addition to the radius r of curvature on the optical axis of the lens system. An E-number designates a power of 10 with respect to the aspherical coefficients, For example, mark E-8 means $10^{-8}$ and this value $10^{-8}$ is multiplied by a numeral before this value.

EMBODIMENT 1

| | $f = 36\sim102$, $F_{NO} = 3.23\sim7.70$, $\omega = 63.4\sim23.9$ | | | | |
|---|---|---|---|---|---|
| i | $r_i$ | $d_i$ | j | $n_j$ | $\nu_j$ |
| 1 | −63.377 | 1.400 | 1 | 1.75500 | 52.3 |
| 2 | 23.404 | 1.140 | | | |
| 3 | 25.115 | 4.590 | 2 | 1.64769 | 33.8 |
| 4 | 1765.771 | variable | | | |
| 5 | 21.326 | 3.520 | 3 | 1.71300 | 53.9 |
| 6 | −40.733 | 0.700 | 4 | 1.84666 | 23.8 |
| 7 | −70.732 | 0.900 | | | |
| 8 | ∞ (diaphragm) | 0.800 | | | |
| 9 | 17.540 | 2.080 | 5 | 1.56384 | 60.8 |
| 10 | 65.528 | 0.810 | | | |
| 11 | −41.120 | 3.700 | 6 | 1.83400 | 37.3 |
| 12 | 15.319 | 2.400 | | | |
| 13 | 32.276 | 2.560 | 7 | 1.56384 | 60.8 |
| 14 | −21.358 | variable | | | |
| 15 | −31.459 | 4.260 | 8 | 1.58144 | 40.8 |
| 16* | −15.771 | 3.499 | | | |
| 17* | −12.979 | 2.174 | 9 | 1.80420 | 46.5 |
| 18 | 77.535 | 6.256 | 10 | 1.69895 | 30.0 |
| 19* | −50.846 | | | | |

Aspherical surface (16th face)

A=9.244601E-6, B=1.594573E-7, C=−1.715580E-9

Aspherical surface (17th face)

A=2.604209E-5, B=1.496540E-7, C=−1.165835E-11

Aspherical surface (19th face)

A=4.551905E-7, B=−8.629262E-9, C=2.035120E-11

Variable amounts

| f | 36 | 60.597 | 102 |
|---|---|---|---|
| $d_4$ | 13.144 | 8.223 | 0.293 |
| $d_{14}$ | 12.969 | 3.897 | 0.919 |

Conditional values $|f_3|/|f_1|=0.686$, $|f_1|/f_w=1.583$, $|f_3|/f_w=1.085$

Conditional values desirably satisfying the conditions (v) to (vii) are provided as follows. $d_{12w}/f_2=0.858$, $d_{23w}/f_w=0.809$, $\nu_{1N}-\nu_{1P}=18.5$ FIG. 2 shows the arrangement of a zoom lens at the wide angle end thereof in this Embodiment 1.

EMBODIMENT 2

| | $f = 36\sim102$, $F_{NO} = 3.23\sim7.7$, $\omega = 63.6\sim23.9$ | | | | |
|---|---|---|---|---|---|
| i | $r_i$ | $d_i$ | j | $n_j$ | $\nu_j$ |
| 1 | −63.083 | 1.400 | 1 | 1.75500 | 52.3 |
| 2 | 24.354 | 1.140 | | | |
| 3 | 25.796 | 4.590 | 2 | 1.64769 | 33.8 |
| 4 | 827.455 | variable | | | |
| 5 | 21.205 | 3.520 | 3 | 1.71300 | 53.9 |
| 6 | −42.520 | 0.700 | 4 | 1.84666 | 23.8 |
| 7 | −77.129 | 0.900 | | | |
| 8 | ∞ (diaphragm) | 0.800 | | | |
| 9 | 17.643 | 2.080 | 5 | 1.56384 | 60.8 |
| 10 | 74.787 | 0.810 | | | |
| 11 | −40.770 | 3.700 | 6 | 1.83400 | 37.3 |
| 12 | 15.448 | 2.400 | | | |
| 13 | 33.403 | 2.560 | 7 | 1.56384 | 60.8 |

-continued

| | $f = 36\sim102$, $F_{NO} = 3.23\sim7.7$, $\omega = 63.6\sim23.9$ | | | | |
|---|---|---|---|---|---|
| i | $r_i$ | $d_i$ | j | $n_j$ | $\nu_j$ |
| 14 | −21.094 | variable | | | |
| 15 | −29.037 | 4.098 | 8 | 1.58144 | 40.9 |
| 16* | −15.564 | 3.572 | | | |
| 17* | −13.129 | 2.174 | 9 | 1.80420 | 46.5 |
| 18 | 1666.860 | 3.316 | 10 | 1.84666 | 23.8 |
| 19 | −61.090 | | | | |

Aspherical surface (16th face)

A=9.742750E-6, B=1.931299E-7, C=−1.966416E-9

Aspherical surface (17th face)

A=2.084409E-5, B=2.096973E-7, C=−6.287605E-10

Variable amounts

| f | 36 | 60.597 | 102 |
|---|---|---|---|
| $d_4$ | 13.230 | 8.310 | 0.379 |
| $d_{14}$ | 12.266 | 3.194 | 0.215 |

Conditional values $|f_3|/|f_1|=0.686$, $|f_1|/f_w=1.583$, $|f_3|/f_w=1.085$

Conditional values desirably satisfying the conditions (v) to (vii) are provided as follows. $d_{12w}/f_2=0.858$, $d_{23w}/f_w=0.809$, $\nu_{1N}-\nu_{1P}=18.5$ FIG. 3 shows the arrangement of a zoom lens at the wide angle end thereof in this Embodiment 2.

FIGS. 4 to 6 are aberration diagrams in the Embodiment 1. FIGS. 7 to 9 are aberration diagrams in the Embodiment 2.

FIGS. 4a, 4b, 4c, 4d and 7a, 7b, 7c, 7d respectively show spherical aberration, astigmatism, distortion aberration and meridional comatic aberration at the wide angle end of the zoom lens. FIGS. 5a, 5b, 5c, 5d and 8a, 8b, 8c, 8d respectively show spherical aberration, astigmatism, distortion aberration and meridional comatic aberration at an intermediate focal length of the zoom lens. FIGS. 6a, 6b, 6c, 6d and 9a, 9b, 9c, 9d respectively show spherical aberration, astigmatism, distortion aberration and meridional comatic aberration at the telescopic end of the zoom lens. In FIGS. 4 to 9, reference numerals dSA and gSA respectively designate spherical aberrations on lines d and g. Reference numeral SC designates a sine condition. Reference numerals S and M respectively designate sagittal and meridional image surfaces on line d.

In the respective Embodiments, the aberrations are preferably corrected.

Figure 10:
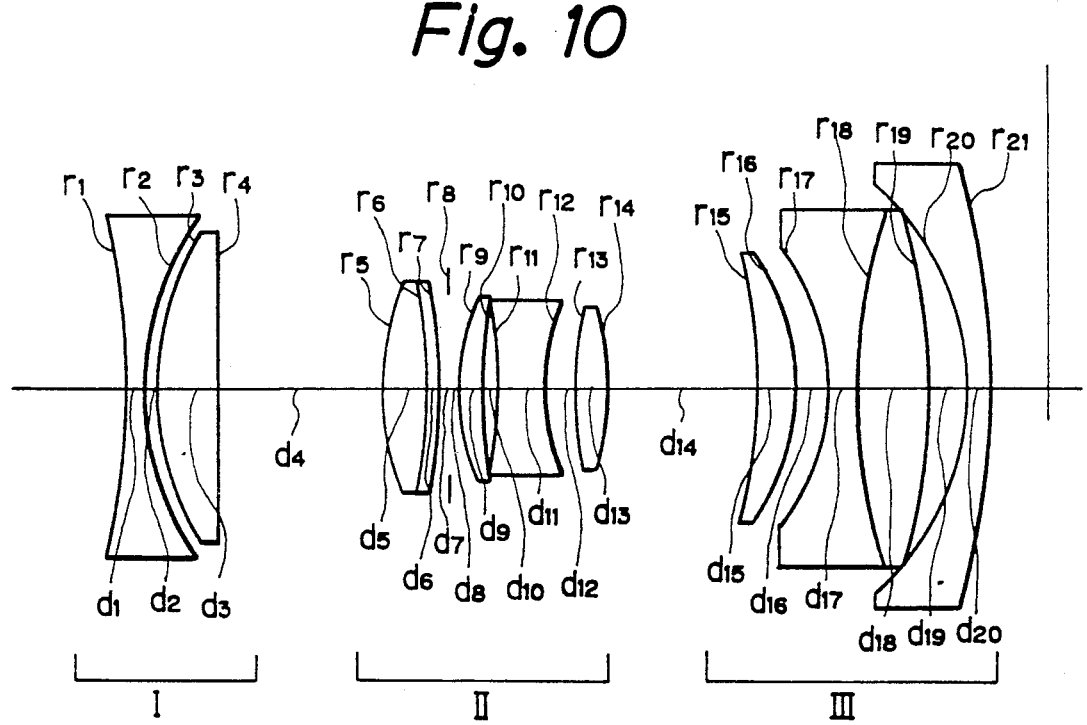
FIG. 10 is a view showing the construction of a zoom lens in accordance with a concrete Embodiment 3 of the present invention.
Figure 11:
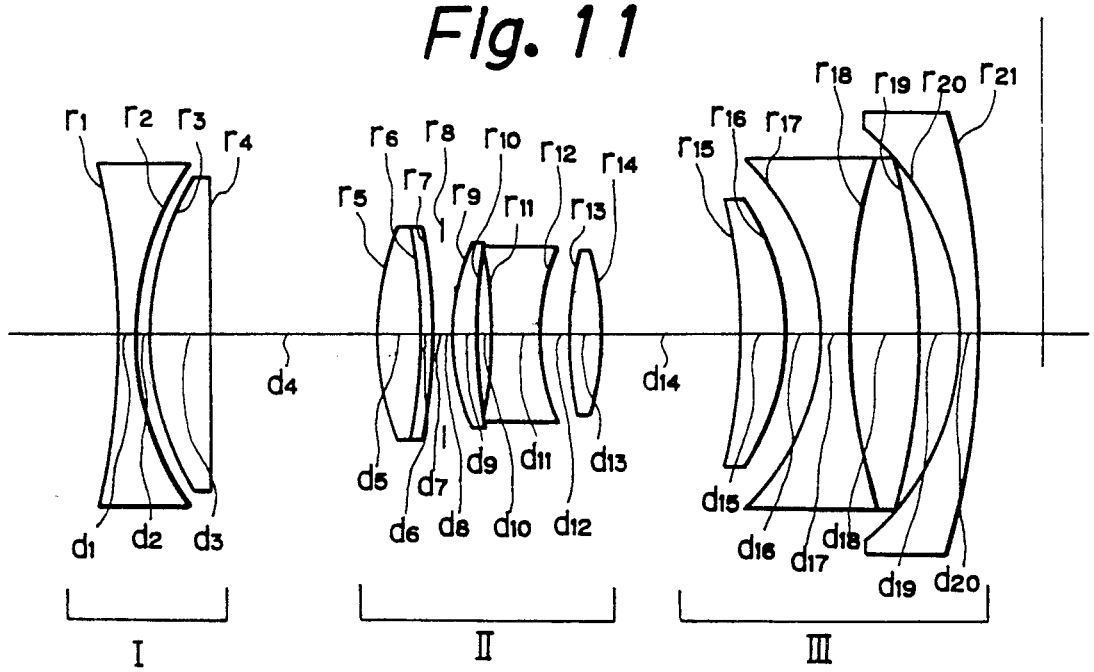
FIG. 11 is a view showing the construction of a zoom lens in accordance with a concrete Embodiment 4 of the present invention.
Figure 12A:
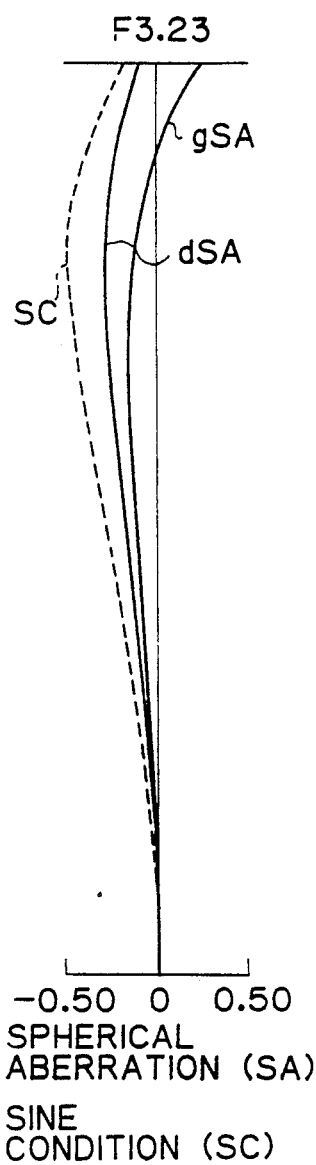
FIGS. 12(a), 12(b), 12(c), 12(d), 13(a), 13(b), 13(c), 13(d), 14(a), 14(b), 14(c) and 14(d) are aberration diagrams of the zoom lens in the concrete Embodiment 3 of the present invention.
Figure 12B:
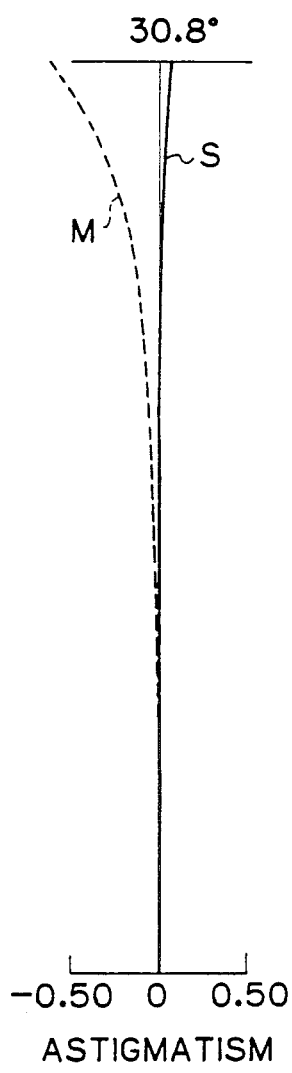
Figure 12C:
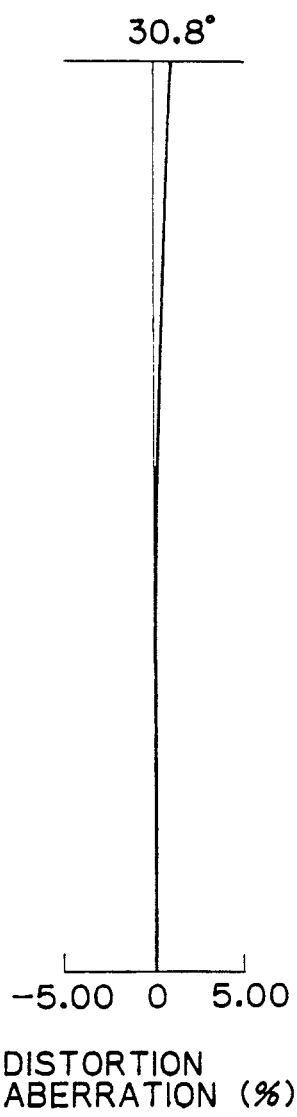
Figure 12D:
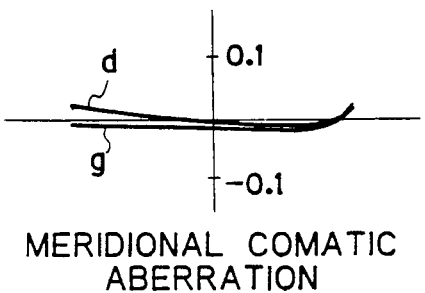
Figure 13A:
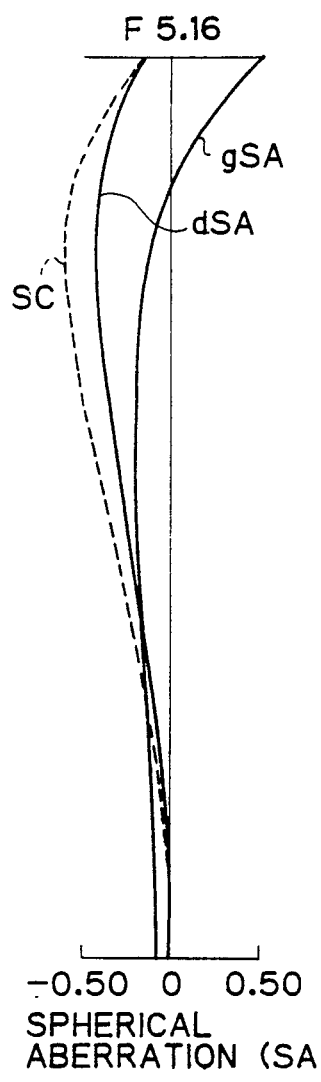
Figure 13B:
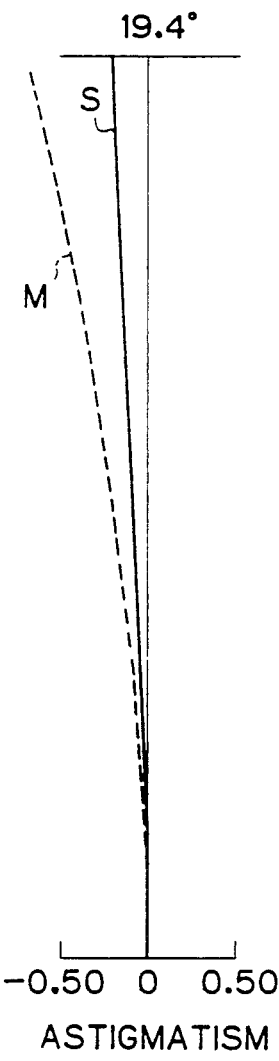
Figure 13C:
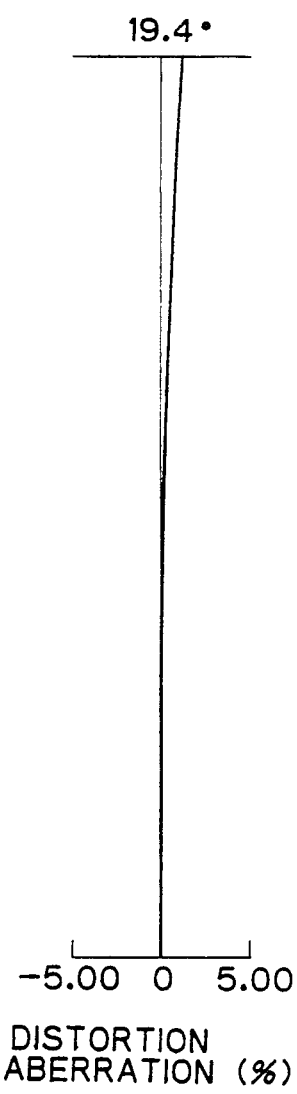
Figure 13D:
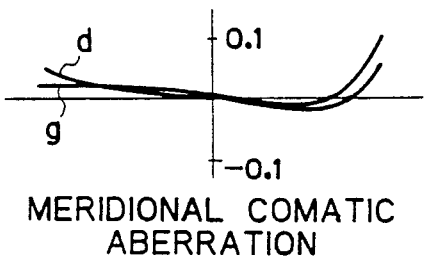
Figure 14A:
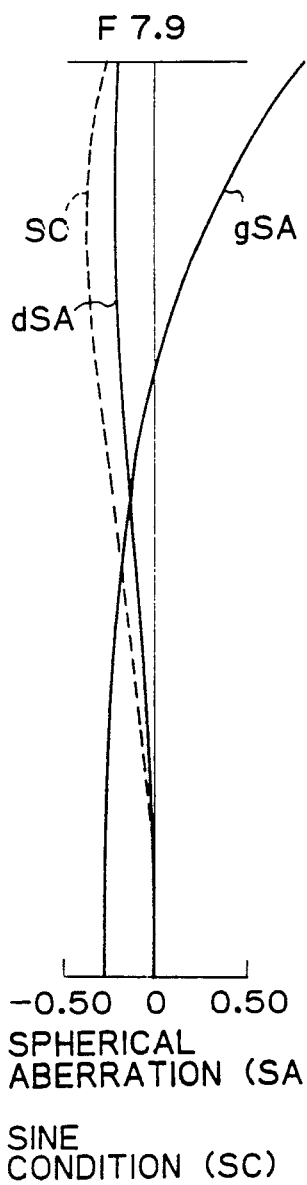
Figure 14B:
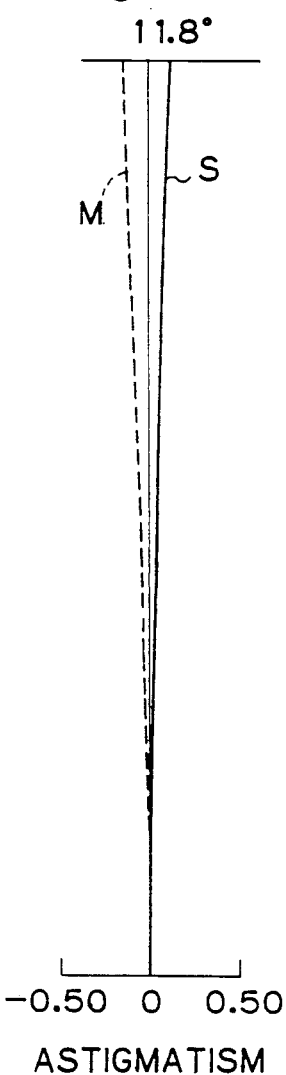
Figure 14C:
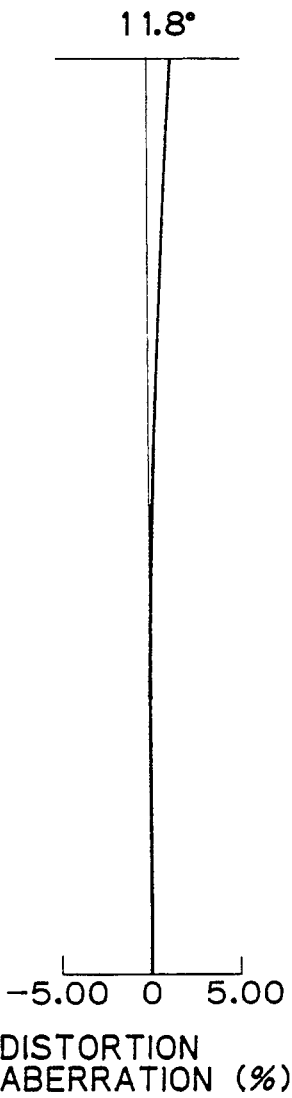
Figure 14D:
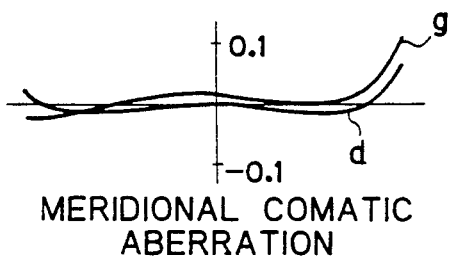
Figure 15A:
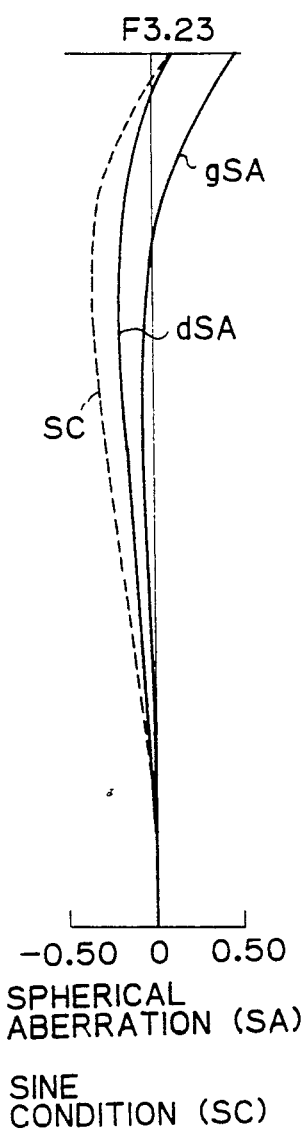
FIGS. 15(a), 15(b), 15(c), 15(d), 16(a), 16(b), 16(c), 16(d), 17(a), 17(b), 17(c) and 17(d) are aberration diagrams of the zoom lens in the concrete Embodiment 4 of the present invention.
Figure 15B:
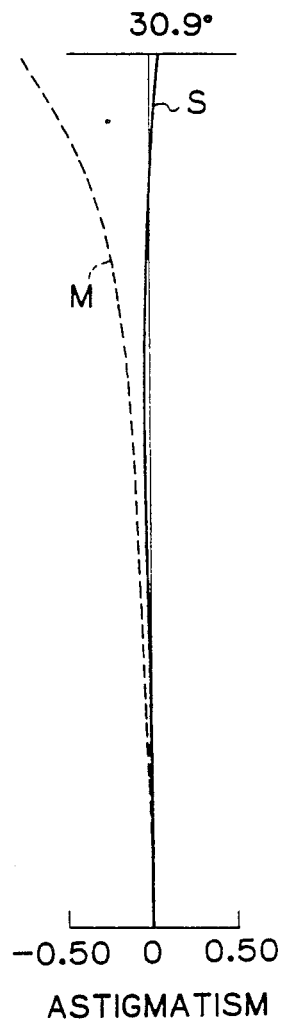
Figure 15C:
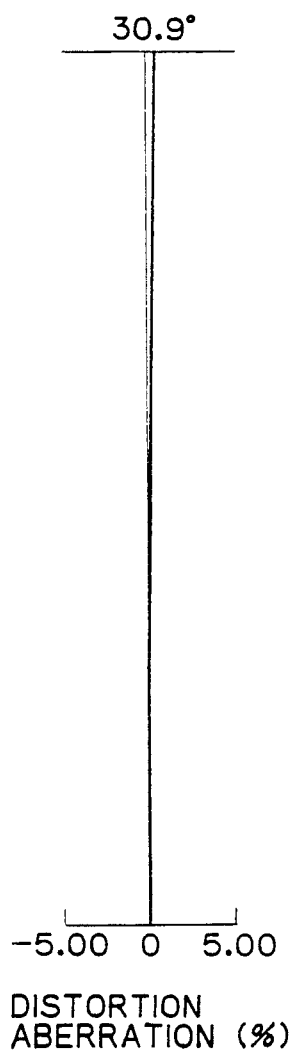
Figure 15D:
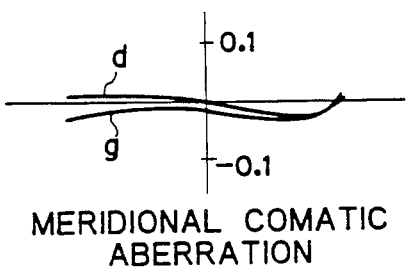
Figure 16A:
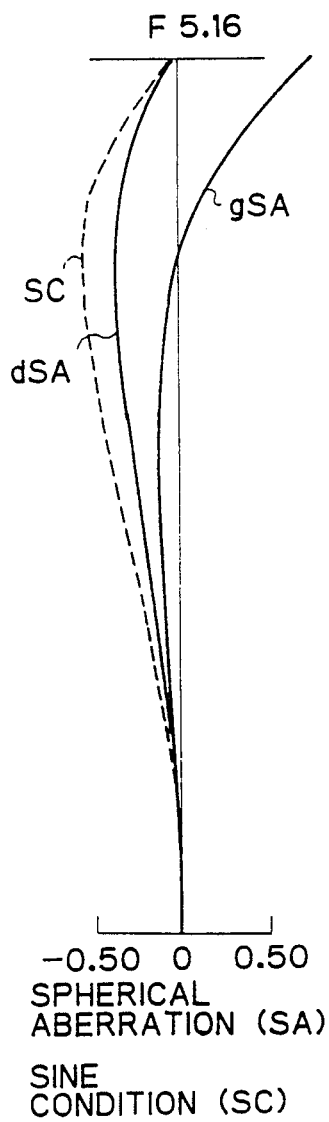
Figure 16B:
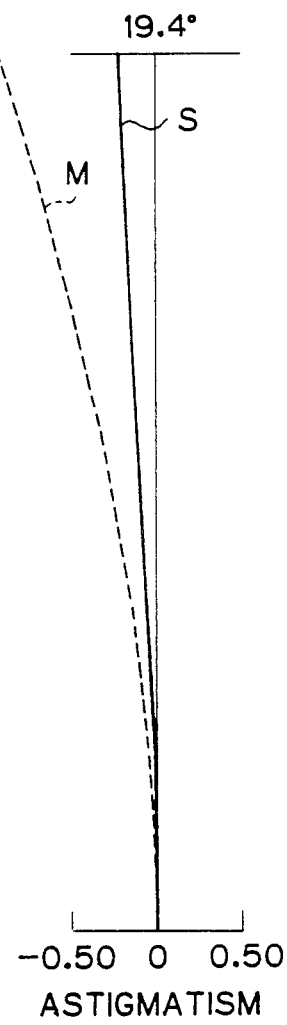
Figure 16C:
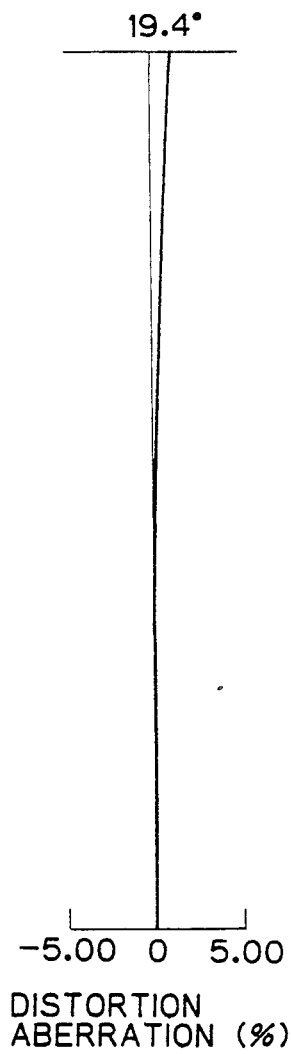
Figure 16D:
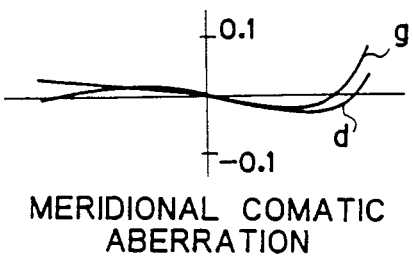
Figure 17A:
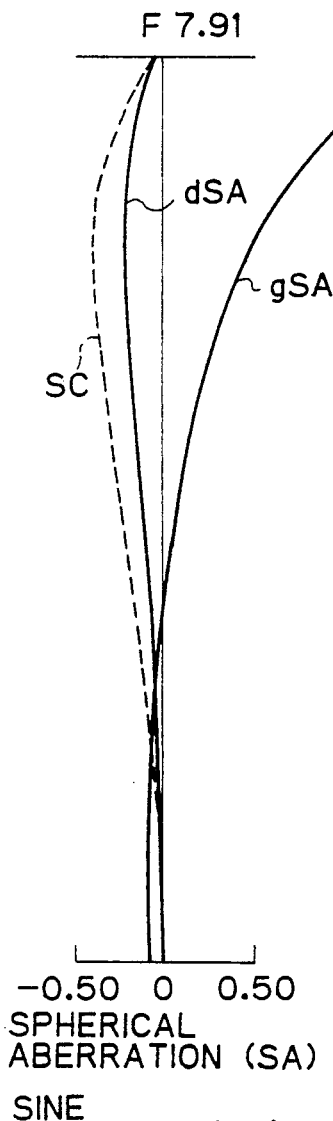
Figure 17B:
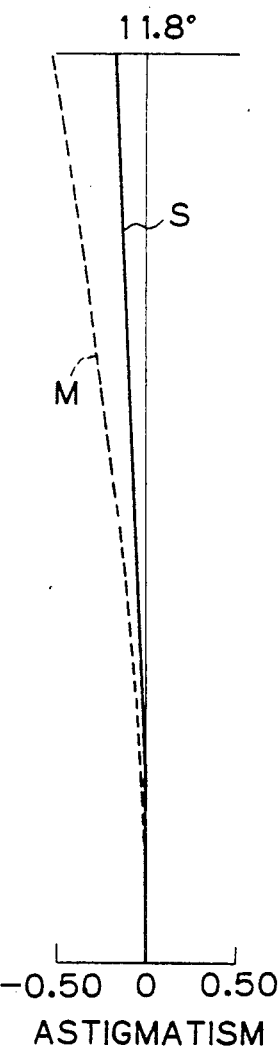
Figure 17C:
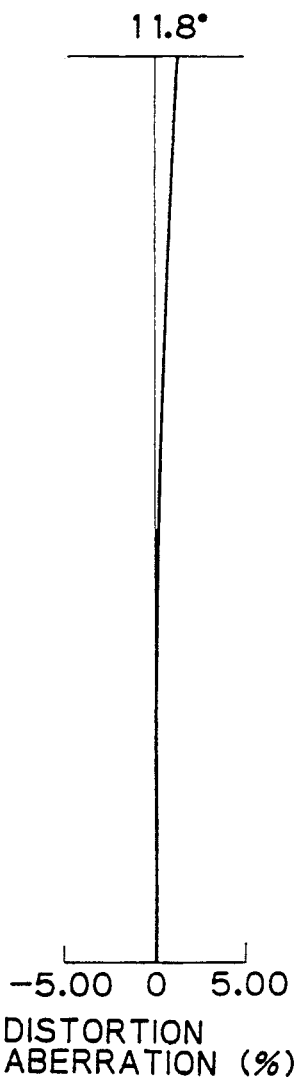
Figure 17D:
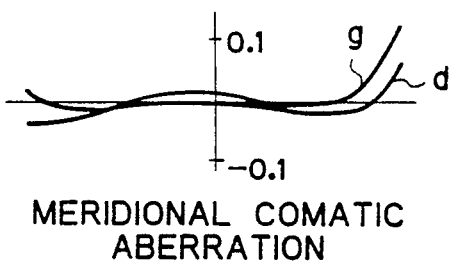

The constructions of compact zoom lenses in concrete Embodiments 3 and 4 in the second embodiment of the present invention are respectively shown in FIGS. 10 and 11.

EMBODIMENT 3

| | $f = 36\sim102$, $F_{NO} = 3.23\sim7.9$, $\omega = 61.5\sim23.7$ | | | | |
|---|---|---|---|---|---|
| i | $r_i$ | $d_i$ | j | $n_j$ | $\nu_j$ |
| 1 | −63.099 | 1.400 | 1 | 1.75500 | 52.3 |
| 2 | 21.488 | 1.140 | | | |
| 3 | 22.869 | 4.590 | 2 | 1.64769 | 33.8 |
| 4 | 3112.066 | variable | | | |

-continued

| $f = 36\sim102, F_{NO} = 3.23\sim7.9, \omega = 61.5\sim23.7$ | | | | |
|---|---|---|---|---|---|
| i | $r_i$ | $d_i$ | j | $n_j$ | $\nu_j$ |
| 5 | 21.745 | 3.520 | 3 | 1.71300 | 53.9 |
| 6 | −36.401 | 0.700 | 4 | 1.84666 | 23.8 |
| 7 | −69.826 | 0.900 | | | |
| 8 | ∞ (diaphragm) | 0.800 | | | |
| 9 | 17.744 | 2.080 | 5 | 1.56384 | 60.8 |
| 10 | 71.805 | 0.810 | | | |
| 11 | −41.227 | 3.700 | 6 | 1.83400 | 37.3 |
| 12 | 15.442 | 2.400 | | | |
| 13 | 30.802 | 2.560 | 7 | 1.56384 | 60.8 |
| 14 | −21.612 | variable | | | |
| 15 | −46.434 | 3.029 | 8 | 1.51680 | 64.2 |
| 16 | −17.977 | 2.538 | | | |
| 17 | −17.620 | 2.233 | 9 | 1.75500 | 52.3 |
| 18 | 41.394 | 5.598 | 10 | 1.69895 | 30.0 |
| 19 | −41.474 | 2.833 | | | |
| 20 | −20.621 | 1.748 | 11 | 1.69680 | 55.0 |
| 21 | −71.549 | | | | |

Variable amounts

| f | 36 | 60.597 | 102 |
|---|---|---|---|
| $d_4$ | 12.644 | 8.572 | 1.631 |
| $d_{14}$ | 11.438 | 4.127 | 1.704 |

Conditional values $|f_3|/|f_1|=0.536$, $|f_1|/f_w=1.583$, $|f_3|/f_w=0.848$

Conditional values desirably satisfying the conditions (v) to (vii) are provided as follows. $d_{12w}/f_2=0.857$, $d_{23w}/f_w=0.865$, $\nu_{1N}-\nu_{1P}=18.5$ FIG. 10 shows the arrangement of a zoom lens at the wide angle end thereof in this Embodiment 3.

EMBODIMENT 4

| $f = 36\sim102, F_{NO} = 3.23\sim7.91, \omega = 61.7\sim23.7$ | | | | |
|---|---|---|---|---|---|
| i | $r_i$ | $d_i$ | j | $n_j$ | $\nu_j$ |
| 1 | −63.501 | 1.400 | 1 | 1.75500 | 52.3 |
| 2 | 21.952 | 1.140 | | | |
| 3 | 23.546 | 4.590 | 2 | 1.64769 | 33.8 |
| 4 | 4362.477 | variable | | | |
| 5 | 21.613 | 3.520 | 3 | 1.71300 | 53.9 |
| 6 | −36.888 | 0.700 | 4 | 1.84666 | 23.8 |
| 7 | −69.139 | 0.900 | | | |
| 8 | ∞ (diaphragm) | 0.800 | | | |
| 9 | 17.576 | 2.080 | 5 | 1.56384 | 60.8 |
| 10 | 70.297 | 0.810 | | | |
| 11 | −40.979 | 3.700 | 6 | 1.83400 | 37.3 |
| 12 | 15.260 | 2.400 | | | |
| 13 | 31.032 | 2.560 | 7 | 1.56384 | 60.8 |
| 14 | −21.541 | variable | | | |
| 15 | −50.059 | 3.645 | 8 | 1.51680 | 64.2 |
| 16 | −18.012 | 2.553 | | | |
| 17 | −18.504 | 2.429 | 9 | 1.80420 | 46.5 |
| 18 | 51.579 | 5.212 | 10 | 1.76182 | 26.6 |
| 19 | −48.629 | 3.235 | | | |
| 20 | −19.945 | 1.324 | 11 | 1.64000 | 60.2 |
| 21 | −73.626 | | | | |

Variable amounts

| f | 36 | 60.597 | 102 |
|---|---|---|---|
| $d_4$ | 12.810 | 8.737 | 1.797 |
| $d_{14}$ | 10.610 | 3.299 | 0.877 |

Conditional values $|f_3|/|f_1|=0.536$, $|f_1|/f_w=1.583$, $|f_3|/f_w=0.848$

Conditional values desirably satisfying the conditions (v) to (vii) are provided as follows. $d_{12w}/f_2=0.857$, $d_{23w}/f_w=0.865$, $\nu_{1N}-\nu_{1P}=18.5$ FIG. 11 shows the arrangement of a zoom lens at the wide angle end thereof in this Embodiment 4.

FIGS. 12 to 14 are aberration diagrams in the Embodiment 3. FIGS. 15 to 17 are aberration diagrams in the Embodiment 4.

FIGS. 12a, 12b, 12c, 12d and 15a, 15b, 15c, 15d respectively show spherical aberration, astigmatism, distortion aberration and meridional comatic aberration at the wide angle end of the zoom lens. FIGS. 13a, 13b, 13c, 13d and 16a, 16b, 16c, 16d respectively show spherical aberration, astigmatism, distortion aberration and meridional comatic aberration at an intermediate focal length of the zoom lens. FIGS. 14a, 14b, 14c, 14d and 17a, 17b, 17c, 17d respectively show spherical aberration, astigmatism, distortion aberration and meridional comatic aberration at the telescopic end of the zoom lens. In FIGS. 12 to 17, reference numerals dSA and gSA respectively designate spherical aberrations on lines d and g. Reference numeral SC designates a sine condition. Reference numerals S and M respectively designate sagittal and meridional image surfaces on line d.

As shown in FIGS. 4 to 9 and 12 to 17, the aberrations are preferably corrected in the respective Embodiments.

As mentioned above, in a novel compact zoom lens in accordance with the present invention, the chromatic aberration of the third lens group with respect to magnification is corrected. Therefore, it is possible to reduce the change in chromatic aberration of the entire lens system with respect to magnification caused by the zooming operation, thereby improving the performance of the zoom lens.

Many widely different embodiments of the present invention may be constructed without departing from the spirit and scope of the present invention. It should be understood that the present invention is not limited to the specific embodiments described in the specification, except as defined in the appended claims.

What is claimed is:

1. A compact zoom lens comprising:
   a first lens group having a negative focal length $f_1$;
   a second lens group having a positive focal length $f_2$; and
   a third lens group having a negative focal length $f_3$;
   the first, second and third lens groups being sequentially arranged from an object side of the zoom lens to an image side thereof;
   the first to third lens groups being moved on the object side while the mutual distances between the first, second and third lens groups are changed to perform a zooming operation from a wide angle side to a telescopic side;
   said third lens group being constructed by positive, negative and positive lenses sequentially arranged from the object side to the image side such that the negative and positive lenses respectively constituting the second and third lenses are joined to each other; and
   said focal lengths $f_1$, $f_2$, $f_3$ and a focal length $f_w$ of an entire lens system at a wide angle end of the zoom lens satisfying the following conditions, $$0.3 < |f_3|/|f_1| < 1.0 \qquad \text{(i)}$$

$$1.2 < |f_1|/f_w < 2.3 \qquad \text{(ii)}$$

$$0.9 < |f_3|/f_w < 1.4 \qquad \text{(iii)}$$

2. A compact zoom lens as claimed in claim 1, wherein an Abbe number $\nu_{3N}$ of the second negative lens and an Abbe number $\nu_{3P}$ of the third positive lens in said third lens group satisfy the following condition, $$\nu_{3N} > \nu_{3P} \qquad \text{(iv)}$$

3. A compact zoom lens as claimed in claim 2, wherein a distance $d_{12w}$ between principal points of the first and second lens groups and a distance $d_{23w}$ between principal points of the second and third lens groups at the wide angle time satisfy the following conditions, $$d_{12w}/f_2 < 1 \qquad \text{(v)}$$

$$d_{23w}/f_w < 0.85 \qquad \text{(vi)}$$

4. A compact zoom lens as claimed in claim 3, wherein the first lens group is constructed by negative and positive lenses arranged from the object side, and Abbe numbers $\nu_{1N}$ and $\nu_{1P}$ of these negative and positive lenses satisfy the following condition, $$\nu_{1N} - \nu_{1P} > 17 \qquad \text{(vii)}$$

5. A compact zoom lens comprising:
a first lens group having a negative focal length $f_1$;
a second lens group having a positive focal length $f_2$; and
a third lens group having a negative focal length $f_3$;
the first, second and third lens groups being sequentially arranged from an object side of the zoom lens to an image side thereof;
the first to third lens groups being moved on the object side while the mutual distances between the first, second and third lens groups are changed to perform a zooming operation from a wide angle side to a telescopic side;
said third lens group being constructed by positive, negative and positive lenses sequentially arranged from the object side to the image side such that the negative and positive lenses respectively constituting the second and third lenses are joined to each other;
said focal lengths $f_1$, $f_2$, $f_3$ and a focal length $f_w$ of an entire lens system at a wide angle end of the zoom lens satisfying the following conditions, $$0.3 < |f_3|/|f_1| < 1.0 \qquad \text{(i)}$$

$$1.2 < |f_1|/f_w < 2.3 \qquad \text{(ii)}$$

$$0.9 < |f_3|/f_w < 1.4 \qquad \text{(iii)}$$

and
an Abbe number $\nu_{3N}$ of the second negative lens and an Abbe number $\nu_{3P}$ of the third positive lens in said third lens group satisfying the following condition, $$\nu_{3N} > \nu_{3P} \qquad \text{(iv)}$$

6. A compact zoom lens comprising:
a first lens group having a negative focal length $f_1$;
a second lens group having a positive focal length $f_2$; and
a third lens group having a negative focal length $f_3$;
the first, second and third lens groups being sequentially arranged from an object side of the zoom lens to an image side thereof;
the first to third lens groups being moved on the object side while the mutual distances between the first, second and third lens groups are changed to perform a zooming operation from a wide angle side to a telescopic side;
said third lens group being constructed by positive, negative, positive and negative lenses sequentially arranged from the object side to the image side such that the negative and positive lenses respectively constituting the second and third lenses are joined to each other; and
said focal lengths $f_1$, $f_2$, $f_3$ and a focal length $f_w$ of an entire lens system at a wide angle end of the zoom lens satisfying the following conditions, $$0.3 < |f_3|/|f_1| < 1.0 \qquad \text{(i)}$$

$$1.2 < |f_1|/f_w < 2.3 \qquad \text{(ii)}$$

$$0.9 < |f_3|/f_w < 1.4 \qquad \text{(iii)}$$

7. A compact zoom lens as claimed in claim 6, wherein an Abbe number $\nu_{3N}$ of the second negative lens and an Abbe number $\nu_{3P}$ of the third positive lens in said third lens group satisfy the following condition, $$\nu_{3N} > \nu_{3P} \qquad \text{(iv)}$$

8. A compact zoom lens as claimed in claim 7, wherein a distance $d_{12w}$ between principal points of the first and second lens groups and a distance $d_{23w}$ between principal points of the second and third lens groups at the wide angle time satisfy the following conditions, $$d_{12w}/f_2 < 1 \qquad \text{(v)}$$

$$d_{23w}/f_w < 0.85 \qquad \text{(vi)}$$

9. A compact zoom lens as claimed in claim 8, wherein the first lens group is constructed by negative and positive lenses arranged from the object side, and Abbe numbers $\nu_{1N}$ and $\nu_{1P}$ of these negative and positive lenses satisfy the following condition, $$\nu_{1N} - \nu_{1P} > 17 \qquad \text{(vii)}$$

10. A compact zoom lens comprising:
a first lens group having a negative focal length $f_1$;
a second lens group having a positive focal length $f_2$; and
a third lens group having a negative focal length $f_3$;
the first, second and third lens groups being sequentially arranged from an object side of the zoom lens to an image side thereof;
the first to third lens groups being moved on the object side while the mutual distances between the first, second and third lens groups are changed to perform a zooming operation from a wide angle side to a telescopic side;
said third lens group being constructed by positive, negative, positive and negative lenses sequentially arranged from the object side to the image side such that the negative and positive lenses respectively constituting the second and third lenses are joined to each other;

said focal lengths $f_1$, $f_2$, $f_3$ and a focal length $f_w$ of an entire lens system at a wide angle end of the zoom lens satisfying the following conditions, $$0.3 < |f_3|/|f_1| < 1.0 \qquad \text{(i)}$$

$$1.2 < |f_1|/f_w < 2.3 \qquad \text{(ii)}$$

$$0.9 < |f_3|/f_w < 1.4 \qquad \text{(iii)}$$

and an Abbe number $\nu_{3N}$ of the second negative lens and an Abbe number $\nu_{3P}$ of the third positive lens in said third lens group satisfying the following condition, $$\nu_{3N} > \nu_{3P} \qquad \text{(iv)}$$

* * * * *